United States Patent [19]

Loeffelman

[11] Patent Number: 4,955,005

[45] Date of Patent: Sep. 4, 1990

[54] UNDERWATER ACOUSTIC ANIMAL GUIDANCE SYSTEM

[76] Inventor: Paul H. Loeffelman, 1270 Clubview Blvd. N., Worthington, Ohio 43235

[21] Appl. No.: 253,985

[22] Filed: Oct. 5, 1988

[51] Int. Cl.$^5$ ............................................. H04B 1/02
[52] U.S. Cl. .................................. 367/139; 43/17.1; 116/22 A
[58] Field of Search ............... 367/139, 165, 173, 188; 43/17.1, 124; 340/384 R, 384 E; 116/22 A; 119/3

[56] References Cited

U.S. PATENT DOCUMENTS

| | | | |
|---|---|---|---|
| 2,757,475 | 8/1956 | Pankove | 43/17.1 |
| 2,861,132 | 11/1958 | Kahn et al. | 367/139 |
| 2,977,705 | 4/1961 | Busnel | 43/17.1 |
| 3,307,285 | 3/1967 | Wells | 367/139 |
| 3,317,889 | 5/1967 | Barrand | 367/139 |
| 3,414,873 | 12/1968 | Richard et al. | 367/139 |
| 3,524,276 | 8/1970 | Thomas et al. | 43/4.5 |
| 3,802,109 | 4/1974 | Stein | 43/17.1 |
| 3,859,954 | 1/1975 | Pauletich | 116/22 A |
| 3,885,338 | 5/1975 | York | 43/17.1 |
| 4,646,276 | 2/1987 | Kowalewski et al. | 367/139 |

OTHER PUBLICATIONS

Haymes et al., Can. J. Fish. Aquat. Sci., vol. 43, 1986-'Exclusion of Adult Alewife, *Alosa pseudoharengus*, Using Low-Frequency Sound for Application at Water Intakes".

*Primary Examiner*—Thomas H. Tarcza
*Assistant Examiner*—Daniel T. Pihulic
*Attorney, Agent, or Firm*—Michael Sand Co.

[57] ABSTRACT

A system and method for developing acoustic underwater stimuli for guiding aquatic animals such as fish, to or from an underwater area. Fish captured from the underwater area are placed in a sound recording chamber and their sounds recorded. The spectrum of the recorded sound is analyzed and is used to vary a primary sound spectrum is accordance with predominate frequencies contained therein to create a sound believed to have the most efficient guidance effect on the fish since the fish are believed to be most responsive to sounds produced by the fish themselves. The captured fish are then placed in a behavior chamber preferably located in the underwater area. The created sound or stimuli is applied to behavior chamber to determine its effect on the fish contained therein and may be modified to arrive at the most effective sound. This sound then is applied to the underwater area and measured to ensure that is has been properly applied.

28 Claims, 3 Drawing Sheets

1 SECOND

UNDERWATER ACOUSTIC ANIMAL GUIDANCE SYSTEM

TECHNICAL FIELD

The invention relates to a system and method for guiding aquatic animals to and from an area with underwater acoustic stimuli. More particularly, the invention relates to such a system and method which uses characteristics of animal sounds to more effectively, efficiently and easily create underwater sounds for guiding the animals and which may incorporate a primary sound that is altered electronically, using measurements of sounds and observation of behavior of aquatic animals native to a particular underwater area in which guidance is desired.

BACKGROUND ART

Various physical devices and systems have been developed for repelling fish and other aquatic animals or barring their passage, especially at the water intakes of industrial plants and electric generating stations to prevent the unnecessary killing of the fish and possible harm to the plant facilities, and the resultant expense of correcting the same. It is also desirable in other applications to attract fish to certain areas such as in the commercial fishing industry, to assist the fish in migration such as salmon moving upstream or downstream, and the like by guiding them to safe passage areas. Some of these prior devices, systems and methods use sound as the main stimuli for achieving the attraction or repulsion of the fish or other aquatic animals. Research has shown that certain sounds have certain effects on various species of fish or other aquatic animals and will either attract or repel the animals depending upon the particular sound applied into the water.

One example of such prior art is shown in Pat. No. 2,977,705, which shows one type of fishing lure used to attract a certain species of fish. In addition to the fishing lure of this patent, there are a considerable number of other fishing lures and related devices which uses various sounds in an attempt to attract fish to the lure.

U.S. Pat. No. 3,317,889 discloses an electronic device for producing a certain vibration in the water to repel dangerous fish such as sharks. It has been found that frequencies between 100 and 14,000 Hertz produce a sound that have a tendency to repel sharks from a certain area.

Pat. No. 3,414,873 discloses another type of system for producing acoustic signals which are transmitted into the water having certain frequency ranges and harmonic content which have been found to attract fish to the signal being produced by a sound generator.

U.S. Pat. No. 3,524,276 discloses another acoustic method in which sound projectors are placed in the water for producing acoustic stimuli within a frequency range of approximately 2.0 to 3.2 kilocycles, which have been found to cause jelly fish to rise to the surface of the body of water for subsequent collection.

U.S. Pat. No. 3,802,109 discloses another system for attracting fish to certain areas by producing sounds under the water in a predetermined timed sequence so as to effectively herd the fish into the desired area by the sound sequence in the water.

U.S. Pat. No. 3,859,954 discloses another type of apparatus for producing sonic vibrations in the water to repel sea life, referred to as a "steam hammer".

U.S. Pat. No. 4,646,276 discloses another underwater device for controlling fish in which vibrations are generated underwater within a watertight tank having certain fundamental frequencies together with means for periodically changing these frequencies. This patent furthermore includes a detailed description of other prior art devices and studies which have been conducted on the effect of the use of acoustic stimuli for controlling the behavior of fish.

The prior art assumes that the target animal will respond to the created sound without actual knowledge of the sound characteristics to which the animal is most sensitive. Some of the prior art methods rely on laboratory results of fish hearing experiments in which fish species hearing abilities encompass a 10,000 Hertz frequency range. Time consuming, costly trial and error testing is required to determine the most effective frequency.

Although many of these prior art devices, systems and methods may perform satisfactorily for certain types of fish and aquatic animals, none of these prior art systems have used or suggest using the sound produced by an aquatic animal inhabiting the specific underwater area in which the guidance is desired as a means for determining the particular acoustic stimuli for controlling the movement of the particular species of fish, whether it be to attract the fish or other aquatic animal to a certain area or to repel the fish or other aquatic animal from a certain area.

Therefore the need exists for an aquatic animal guidance system which will minimize harm to the animals by effectively repelling them from dangerous areas near human activities or effectively guiding them to a safe or desired areas with a minimum amount of time, equipment and expense. There is no such known prior art system or method which achieves these objectives.

DISCLOSURE OF THE INVENTION

Objectives of the invention include providing an improved underwater acoustic animal guidance system and method which uses a primary sound that is altered electronically using measurements of the aquatic animal sounds and observations of the aquatic animal behaviors of certain species of animals desired to be guided by the system; and in which the measured sound is amplified and then radiated by suitable electronically driven projectors in a predetermined underwater area, for achieving the guidance of the animals located therein.

A still further objective of the invention is to provide such an improved system and method which uses site-specific factors including bathymetry, substrate morphology, hydraulics and animal species to produce effective acoustic stimuli; and in which such on-site factors have been found to more effectively guide aquatic animals than if the stimuli were produced off-site without using actual site-specific factors.

Another objective of the invention is to provide such an improved guidance system and method in which the preferable primary sound that is used has a spectrum that is characterized by predominate frequencies, preferably at 120, 240, 360, 480, and 720 Hertz, with lower amplitude frequencies inbetween these predominate frequencies up to 2000 Hertz.

A further obJective is to provide such an improved system and method in which the primary spectrum is altered electronically to emphasize or de-emphasize frequencies depending upon the desired guidance effect, site conditions and aquatic animal species; and in which additional spectral variability can be produced by adding additional frequencies higher than 2000 Hertz.

Still another objective of the invention is to provide such a guidance system and method in which the primary spectrum and its enhancements are effective because they cover the range of frequencies an aquatic animal normally produces and receives, since sounds naturally produced by animals and received by others vary within and among species, which variability is covered by the system of the invention.

A further objective is to provide such an improved system and method which includes means for easily, quickly and efficiently determining without large scale, long-term studies, the amplitudes and frequencies of the spectrum necessary to achieve the desired guidance effect; and in which increasing the amplitude greater than the amplitude of the aquatic animal sounds will begin to repel some of the animals whereas relatively higher amplitudes are required to repel most of the other animals in that species.

A still further objective is to provide such an improved system and method in which biological tuning information is generated at the site of the underwater area in which the guidance is desired by acoustic spectrum data obtained from the sounds of the animals to be repelled; and in which observations of animal behavior of actual catches of the animals in the particular underwater area to different sound fields is used to electronically modify the primary sound for maximum guidance effect to reduce heretofore costly and time consuming trial and error testing in a laboratory environment.

Another objective of the invention is to provide such an improved system and method in which acoustic recording apparatus measures and records sounds from aquatic animals captured from the particular underwater area where guidance is desired, which sounds are then electronically tuned and applied to the captured animals in a behavior chamber whereby the observed response of the fish or other aquatic animals confined in the chamber can be observed and measured in the water body which the animal inhabits to determine the most effective sound spectrum to be applied to a specific underwater area.

A still further objective of the invention is to provide such an improved system and method in which the recorded sound of the captured aquatic animal is analyzed and used for altering a primary sound for the guidance effect since the sounds produced by the animals themselves are more likely to be more sensitive to the receiving ability of the animals for those sounds; in which the complete spectrum of the sound or parts of the spectrum can also be later played through projectors to guide animals within the predetermined underwater area; and in which the animal sound in the primary sound spectrum can be compared to other stimuli, like rushing water, to determine common spectral components that can enhance the guidance or repulsion effect.

These objectives and advantages are obtained by the improved system of the invention, the general nature of which may be stated as a system for guiding aquatic animals to and from an underwater area with underwater acoustic stimuli including, acoustic recording chamber means for measuring and recording sounds of aquatic animals of the type believed present in said underwater area contained in said chamber means; behavior chamber means adapted to be located in said underwater area for observing responses in said captured aquatic animals contained in the behavior chamber means to acoustic radiation; and means for developing the acoustic radiation using information from the animal sounds recorded in the recording chamber means.

These features and advantages are also obtained by the improved method of the invention, the general nature of which may be stated as including a method for guiding aquatic animals located within a predetermined underwater area including the steps of, placing animals of the type believed to be present in said underwater area in a recording chamber generally free of external stimuli; recording sounds produced by the animals in the chamber; placing the animals in a confined area within said predetermined underwater area; generating acoustic radiation derived from said recorded sounds of the animals; applying the acoustic radiation to said animals contained in the confined area; and observing behavioral responses of the animals in the confined area to the acoustic radiation applied thereto.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 6:
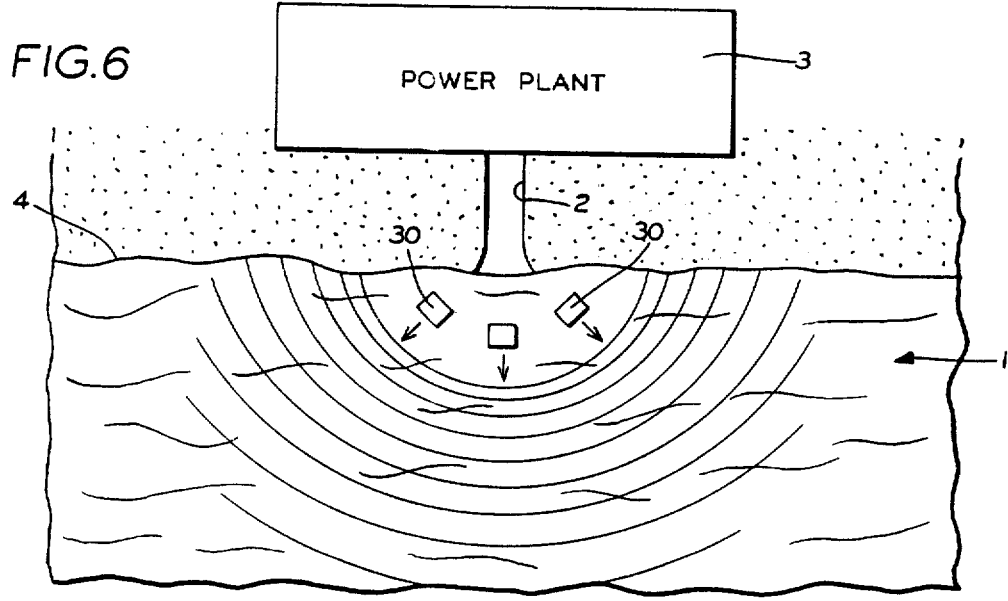
FIG. 6 is a diagrammatic view showing the improved system and method being used to repel fish away from the intake of an electric power generating station.
Figure 7:
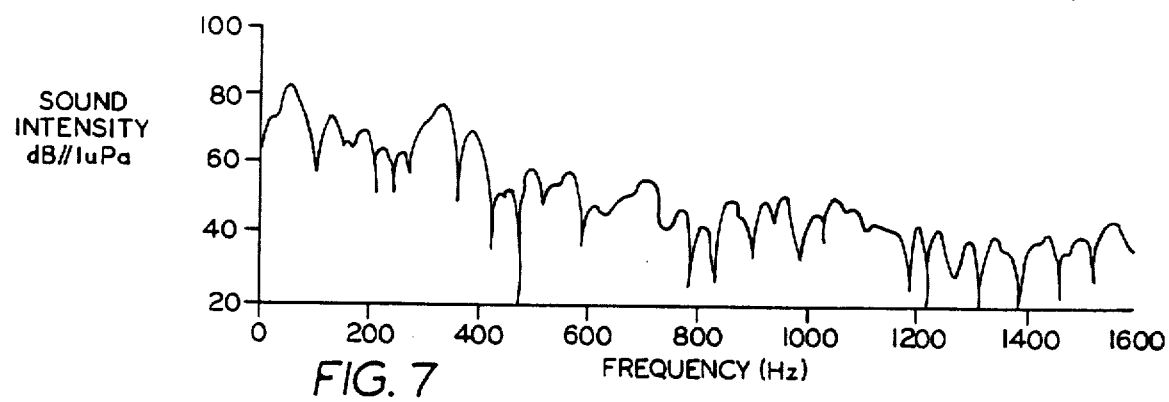
FIG. 7 is a representation of the sound spectrum produced by Salmo trutta or brown trout.
Figure 8:
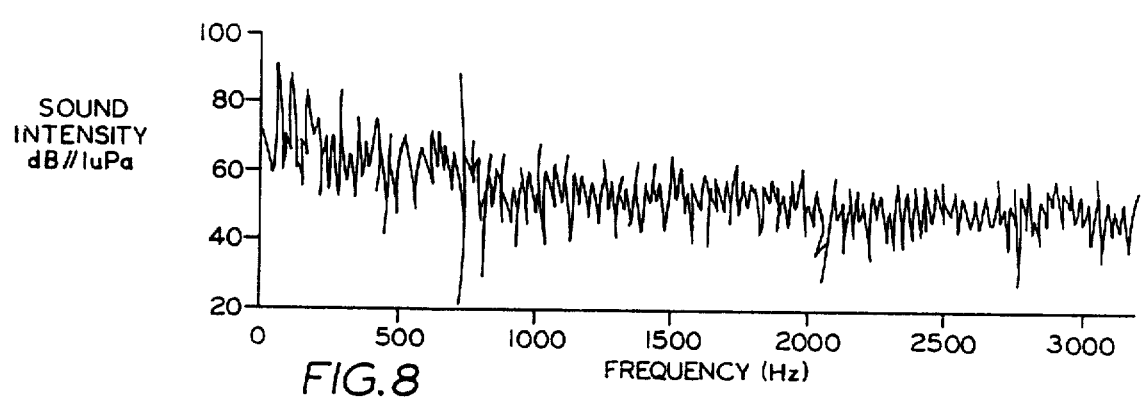
FIG. 8 is a representation of the sound spectrum produced by Micropterus punctulatus or spotted bass.
Figure 9:
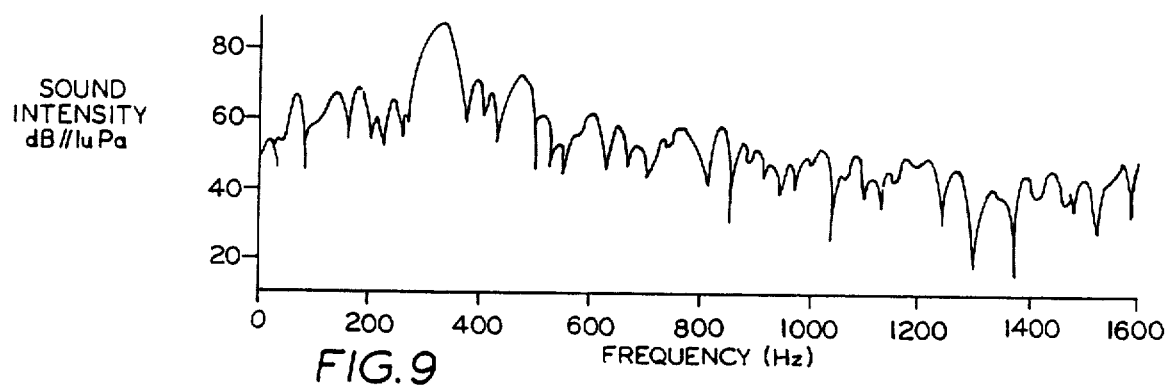
FIG. 9 is a representation of the sound spectrum produced by Ictalurus punctatus or channel catfish.
Figure 10:
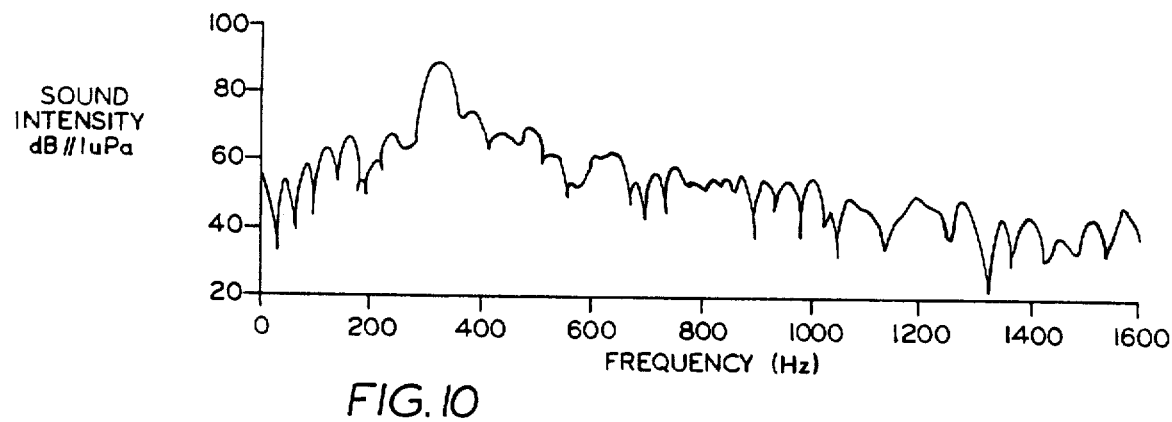
FIG. 10 is a representation of the sound spectrum produced by Morone saxatilis or striped bass.
Figure 11:
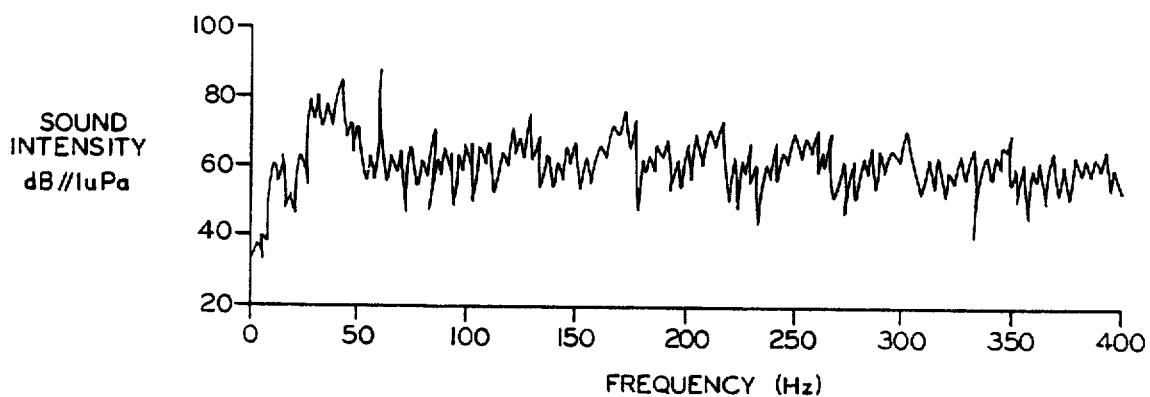
FIG. 11 is a representation of the sound spectrum produced by Aplodinotus grunniens or freshwater drum.

One particular type of industrial plant incorporating the improved system and utilizing the improved method of the invention, is shown in FIG. 6 The particular underwater area in the which control or guidance of aquatic animals is desired, is indicated generally at 1, and is located adjacent the water intake 2 for an electric generating power plant 3. Plant 3 is located adjacent the shoreline 4 of underwater area 1. This particular underwater area could be a river, lake, ocean, or the like and is located adjacent the water intake of a electric power plant, hydroelectric plant or other type of industrial plant which uses large amounts of water. The guidance system also can be used for diverting unwanted but important species of aquatic animals which might otherwise be accidentally caught in commercial fishing nets, or even used adjacent to "fish ladders" or downstream fish bypasses at dams or other areas where the control of fish or other aquatic animals is desired. The particular installation shown in FIG. 6 is merely illustrative of one type of underwater area in which the improved system is incorporated.

Figure 2:
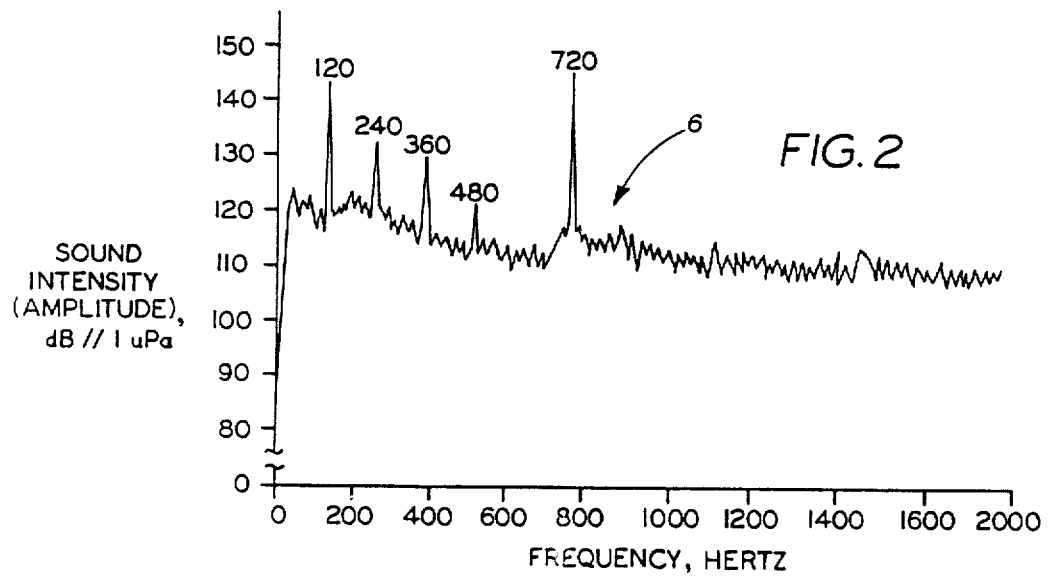
FIG. 2 is a typical version of the primary sound which may be used in the improved guidance system and method.

The improved system may incorporate as one of its features, a primary sound, the spectrum of which is indicated generally as shown at 6 in FIG. 2. The spectrum is characterized by predominant frequencies at 120, 240, 360, 480, and 720 Hertz, with lower amplitude frequencies in between these frequencies up to 2,000 Hertz. Like all frequencies in this spectrum, the predominant frequencies continually change in amplitude, independent of one another. One frequency increases and decreases relative to other frequencies from one instant to another. Although this primary sound may vary somewhat, the spectrum shown in FIG. 2 has been found to be extremely effective for guiding fish, and in particular for repelling fish since it has primary frequencies encompassed in the sounds produced by many species of fish of the type to be guided by the present system and method. This sound was initially produced by a particular electric generating plant and was obtained adjacent the intake thereof in the underwater area adjacent the intake, and was found to be highly effective for repelling various species of fish from the area.

This spectrum is electronically altered to emphasize or de-emphasize frequencies depending upon the desired guidance effect, site conditions and animal species. Additional spectral variability can be produced by adding additional frequencies greater than 2 kHz and sweeping frequencies. This spectrum and enhancements to it, are effective because they cover the range of frequencies an aquatic animal normally produces and receives. Sounds naturally produced and received by other animals vary within and among species and the improved guidance system and method of the invention covers this variability. It has been found and determined that the amplitudes of frequencies in this spectrum are important for guiding aquatic animals.

The guidance system of the invention includes a system and method for easily, quickly, and efficiently determining without large scale, long-term studies, the amplitudes and frequencies of the spectrum necessary to achieve the desired guidance effect. The sound of individual fish, for instance, may only be slightly greater in amplitude than the ambient acoustic environment in which they live. Increasing amplitudes greater than the amplitudes of the animal's sounds, will begin to repel an animal, but relatively high amplitudes are required to repel most individuals of a species. Fresh water fish, for instance, can be substantially repelled at amplitudes of frequencies in the base spectrum of approximately 130 to 150 dB//1uPa. Other individual fish can be repelled at higher amplitudes.

In accordance with one of the features of the invention, the biological tuning information is generated at the underwater area in which the guidance of the aquatic animals is desired, and includes acoustic spectrum data from sounds of the particular aquatic animals in underwater area 1. Observations of aquatic animal behavior by means such as sonar and actual catches of the aquatic animals in underwater area 1 in different sound fields, also are used to electronically modify the primary sound for maximum repelling or attraction effect.

The guidance system and method of the invention, for both repelling and attracting aquatic animals, utilizes measurements of animal sounds to tune the system for maximum guidance effect as described in greater detail below. In order to maximize measurement accuracy, minimize noise from other sources, and to provide convenient efficient means of recording and measuring the sounds on-site, a portable acoustic recording apparatus indicated generally at 8 (FIG. 3), is setup on site generally adjacent underwater area 1.

Figure 3:
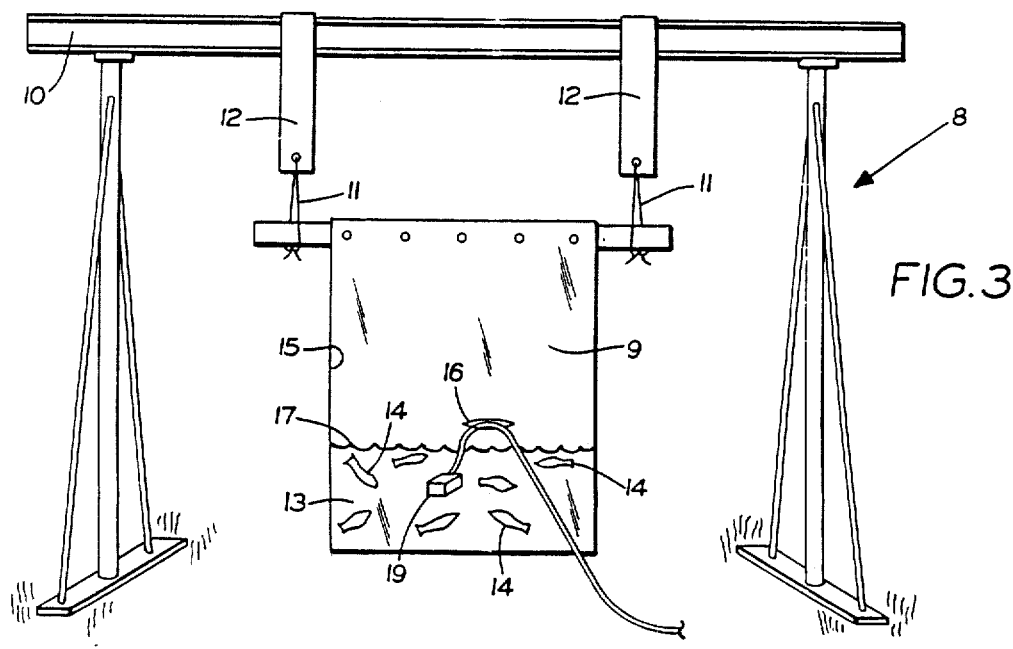
FIG. 3 is a diagrammatic perspective view of the acoustic recording chamber of the improved system.

Apparatus 8 preferably consists of a heavy gauge, transparent plastic bag 9 which provides an acoustic chamber 15 therein, which is suspended in air from a frame 10 by a plurality of cables 11 and elastomeric straps 12. Bag 9 is suspended so as to be free from contacting any adjacent surface of the frame. Also cables 11 and straps 12 dampen vibrations from sources outside the chamber, preventing or materially reducing any such external vibrations from being imparted onto bag 9 and into chamber 15. Bag 9 is sufficiently large to hold a sufficient quantity of water 13 taken from underwater area 1 and a quantity of aquatic animals 14 represented diagrammatically by fish. An opening 16 is formed in bag 9 above water surface 17 for insertion of monitoring instruments for determining water quality, or a water hose for filling the chamber, for placement of the fish into the chamber, and for receiving a hydrophone for sound recording, which is shown in FIG. 3 and indicated at 19.

In transparent acoustic chamber 15, animal sounds are recorded while behavior of the fish and the physical means of sound production can be observed. The recorded sound is analyzed for altering the primary sound for achieving the desired guidance effect. The complete spectrum of the sound, or parts of the spectrum can also be later played through sound projectors to attract or repel aquatic animals to and from an area in underwater area 1. For example, sounds of male aquatic animals can be played to attract female aquatic animals. Also spectra recorded from the animal sound and the primary sound spectrum can be compared to spectra of other stimuli like rushing water, to determine if common spectral components could enhance the guidance effect. For example, a rushing water spectrum of salmon spawning areas might be used to attract adult salmon to fish ladders so they can more efficiently move up the ladders to return to their spawning areas.

Figure 4:
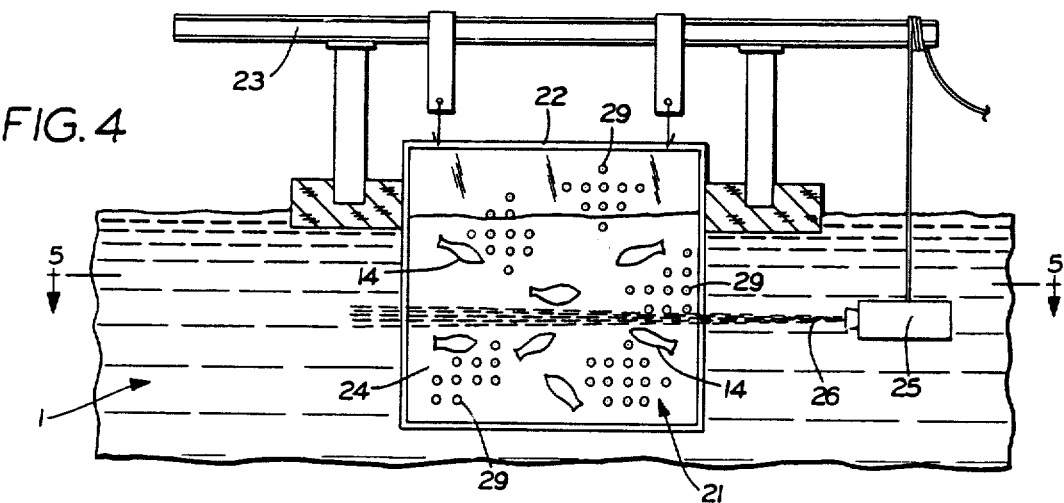
FIG. 4 is a diagrammatic elevational view of the aquatic animal behavior chamber of the invention.

The responses to the sound spectrum generated in response to the animal sounds recorded in acoustic chamber 15, is evaluated in an animal behavior chamber 21 shown diagrammatically in FIG. 4. Behavior chamber 21 is formed by a heavy gauge perforated polyethylene plastic bag 22, the top of which is kept open by suspending it from a frame 23 within underwater area 1. Bag 22 preferably is at least 5 mils thick which provides sufficient strength, yet does not change the characteristic of the acoustic radiation applied thereto. The bag is formed with a plurality of perforations 29 sufficiently large to enable the surrounding water to move freely through the bag yet small enough to prevent the fish from escaping. This places the fish in a natural setting generally the same as underwater area 1.

Aquatic animals 14 are placed in chamber 21 and observed with a vertical or horizontal sonar 25 or with underwater cameras (not shown). The primary sound 6 is altered using the information obtained from the recorded sounds of the animals in acoustic chamber 15, and as the primary sound is altered, the behavior of the aquatic animals is observed for change. Sonar monitoring, for example, will show the animal's movement as the sound is altered. For repelling effect with the appropriate spectrum, animals 14 will try to escape from the chamber. These movements can be quantitively and qualitively defined and similarly compared to movements stimulated by other modifications to the spectrum.

Figure 5:
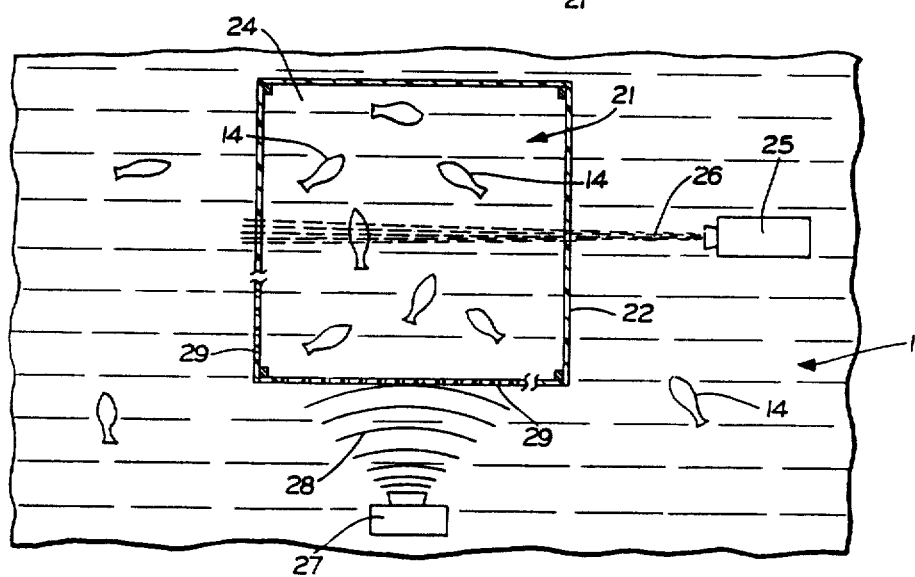
FIG. 5 is a diagrammatic sectional view taken on line 5—5, FIG. 4.

In the particular configuration of behavior chamber 21, shown in FIGS. 4 and 5, the movement of the animals across sonar beam 26 can be determined with respect to the sound or acoustic radiation applied to chamber 21 by projectors 27. The amount of animal movement across beam 26 will provide a basis for determining the effect of the particular acoustic radiation being emitted by projector 27 on the animals. This observation of animal behavior in response to the generated acoustic radiation 28 in the site-water 24 located within chamber 21, then is used to tune the guidance system. Sonar is the preferred monitoring means since it has less effect on the fish than would the bright lights of a camera system or the like.

It is believed that the use of the actual species of aquatic animal taken from a particular underwater area, in combination with the use of the sound produced thereby in a generally "sterile environment", of acoustic chamber 15, provides a highly accurate and effective means for determining the particular sound spectrum or acoustic radiation most effective for guiding a particular species of animal of a particular underwater area 1. These animal sounds then are used to control a primary sound 6 followed by the observance of the behavior of the captured animals when returned to their natural environment in the underwater area 1 located within behavioral chamber 21. This desired sound spectrum may be used for repelling the animals from water intake 2 as shown in FIG. 6 by use of one or more underwater sound projectors 30, or for guiding the animals to a particular area, such as a fish ladder or the like. No known prior art method or system has used the actual sounds produced by the fish located in a particular area in which control or guidance is desired, in order to devise the most effective acoustic radiation for guiding such fish.

It is believed that a particular acoustic radiation used to guide fish in a certain body of water may not be as effective for guiding the same species in a different body of water with different bathymetry, substrate morphology, water velocity and the like since surrounding sound and vibration changes the effect on the fish from that achieved by the same radiation in a different underwater environment. Therefore use of on-site testing, that is, by fish preferably captured from the water and behavior changes when placed back into the same underwater environment is believed to achieve the most effective results.

Electronic tuning using the biological information obtained from acoustic chamber 15 is easily, quickly and precisely performed with appropriate instruments. These instruments, all of which are well known in the art, include equalizers, signal generators, sweep generators and other wave form generators. Equalizers raise and lower the amplitude range of frequencies in the spectrum and the signal generators inject new frequencies into the spectrum. Sweep generators add variability to the spectrum by injecting higher and lower frequencies in the specified range. This tuning can be performed with or without the primary sound spectrum 6, although repulsion has been found to be more effective with the primary sound spectrums similar to that shown in primary sound 6.

Equalizers will intensify those frequencies in the spectrum which are found in the animals' sounds obtained from acoustic chamber 15. Wave form generators will create additional intensity changes in the frequency of the spectrum so the animal will not acclimate to the sound. The repulsion effect would be lessened if the aquatic animal is allowed to become acclimated to the sound and if the amplitude does not exceed the animals' tolerance level. The predominate frequency range of individual aquatic animal sounds within a species and frequency ranges of a number of species is covered by the primary sound spectrum and such wave form generators.

Figure 1:
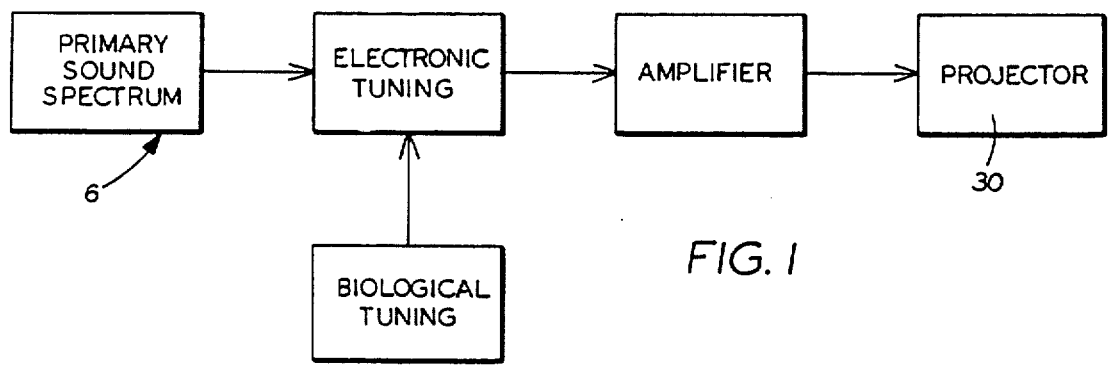
FIG. 1 is a block diagram showing broadly the features and method steps of the improved system and method.

Specific examples of actual sounds produced by certain fish are shown in FIGS. 7-12 which illustrate in more detail how the improved guidance system operates and the method of guiding animals is achieved and carried out. These five sound spectrums that were produced by fish and recorded in acoustic chamber 15 show that the frequencies with the greatest intensity are less than 1000 Hertz. These high amplitude frequencies are probably most important to the fish which are receiving the sounds since they are producing the same. This biological tuning information greatly narrows the broad frequency range possible for electronic tuning of the created sound as shown in FIG. 1 by eliminating all frequencies greater than 1000 Hz. Eliminating less important frequencies is important because the overall power of sound projectors is limited. By removing the unnecessary frequencies, power availability is improved to be more effectively applied to the improved frequencies. Maintaining high sound frequencies is required to provide an effective guidance system using the least number of projectors and ancillary equipment at the lowest cost.

Figure 12:
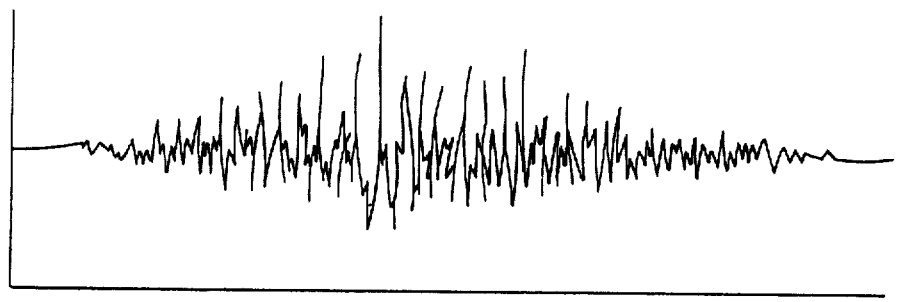
FIG. 12 is a representation of the timing of the sound spectrum of FIG. 11.

After analysis of the animal's sounds and judgement of the important characteristics of the sounds from the spectrums produced thereby as shown in FIGS. 7-12, electronic tuning of an artificial sound is performed by incorporating the particular characteristics of the recorded sounds in the tuning process. These characteristics include the time duration of the animal sound and the time duration between sounds as shown in FIG. 12, which are also measured during the recording of the fish sounds in acoustic chamber 15 (FIG. 11), the frequencies with the highest amplitudes, and the highest amplitudes of frequencies. For example, various electronic signals are emphasized like emphasizing single or multiple frequencies for sweeping a range of frequencies radiated through projectors 25, while the animal is observed to determine if the guidance effect is achieved. The same animal which produced a sound used in the tuning process, can then be placed in animal behavior chamber 21 and observed for responses to the sound stimuli, visually with sonar or underwater cameras. When the guidance system is fully tuned, that is, when a particular sound produces a greatest behavioral change from normal which provides the most effective guidance effect, this sound then is applied to underwater area 1 by projectors 30.

As a further illustration, the spectra of the fish sounds in FIGS. 7-12 can be used for producing a repelling effect. The frequency range with highest amplitudes is between 0 and 1,000 Hertz. In these spectra, one or a few frequencies within this range are more intense than most of the other frequencies. For example, in the spotted bass spectrum of FIG. 8, frequencies of approximately 100, 200, 300 and 725 Hertz are important while 60, 120 and 330 Hertz are important in the brown trout spectrum of FIG. 7. The primary sound in FIG. 2 would be initially selected because it has primary frequencies encompassed by these fish and would initially be radiated by the projectors into the behavioral chamber 21 where the movement of the fish would be observed. The normal behavior of fish is to move from side to side freely within the chamber which is detected by the sonar 25 and are registered as "hits" as the fish cross sonar beam 26 with projector 27 applying the proposed acoustic stimuli. The swimming of the fish will be less when affected by the applied acoustic stimuli causing the fish to migrate to the sides of the chamber whereby the sonar records fewer "hits". The primary sound then is altered by sweeping frequencies with the subsequent effect on the fish being observed by the sonar. Sweeping frequencies whose amplitudes are increased with an equalizer might cause fish to stop swimming back and forth and stay only near the sides of the chamber, where the sonar would show virtually no "hits". Thus, these sounds produce the maximum repelling effect for these fish and can be verified with fish in the open water body 1, by comparing catches of fish from this area or by actual observation of the fish therein. Fewer fish would be caught in an area with the sound ON than with the sound OFF.

The sound or acoustic stimuli which is applied to the behavior chamber and has been found to be most effective, then is used on-site by sound projectors 30 as shown in FIG. 6 and checked by the use of hydrophones or the like to ensure that the sound spectrum has been applied properly and does not contain self-cancelling features or the like due to the placement of projectors 30 or the cancelling effect caused by the surrounding underwater body and underwater terrain.

Accordingly, the improved guidance system and method of the invention provides for the guidance of aquatic animals which are found in a particular underwater area by utilizing the sounds produced by the particular animals of the area, by observing the behavior modification of the animals in the behavior chamber located in the natural underwater area or habitat of the animal, and using the observation to produce a more effective guidance system using acoustic radiation than heretofore believed possible with acoustic radiation systems wherein the tests did not use the natural sounds emitted by the aquatic animals for achieving the desired acoustic radiation. No known method or guidance system of which I am aware has ever used the sounds produced by animals captured from a particular underwater area in which the guidance is desired, in order to obtain the most effective acoustic radiation for the guidance system.

Accordingly, the improved underwater acoustic animal guidance system is simplified, provides an effective, safe, inexpensive, and efficient system and method which achieves all the enumerated objectives, provides for eliminating difficulties encountered with prior systems and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved underwater acoustic animal guidance system is constructed and used, the characteristics of the system, and the advantageous, new and useful results obtained; the new and useful structures, devices, elements, arrangements, parts, combinations and method steps, are set forth in the appended claims.

What is claimed is:

1. A system for guiding aquatic animals to or from an underwater area with underwater acoustic stimuli including:
   (a) acoustic recording chamber means for measuring and recording sounds of aquatic animals of the type possibly present in said underwater area contained in said chamber means;
   (b) means for electrically developing a new artificial sound using information from the animal sounds recorded in the recording chamber means;
   (c) behavior chamber means adapted to be located in said underwater area for observing responses in said aquatic animals contained in the behavior chamber means when the new artificial sound is applied thereto; and
   (d) means for adjusting the new artificial sound for increasing its guiding effectiveness on the aquatic animals upon observing the effect of the artificial sound being applied to the animals in the behavior chamber means.

2. The system defined in claim 1 in which the new artificial sound contains a primary sound.

3. The system defined in claim 2 in which the primary sound has predominant frequencies at 120, 240, 360, 480 and 720 Hz.

4. The system defined in claim 1 in which the acoustic recording chamber means includes a frame, a container forming a chamber containing a supply of water obtained from said underwater area, and suspension means for suspending the container in air and free from contact with the frame; and in which the aquatic animals in said container were captured from said underwater area.

5. The system defined in claim 4 in which the suspension means includes supporting cables and elastomeric isolators to dampen vibration from sources outside the container.

6. The system defined in claim 5 in which the container of the acoustic recording chamber means is a transparent plastic bag.

7. The system defined in claim 6 in which the bag is formed with an access opening above the surface of the water contained therein; and in which instruments are placed into the supply of water through the access opening for measuring and recording the sounds of the aquatic animals contained in the chamber.

8. The system defined in claim 1 in which the behavior chamber means include a frame and a perforated container adapted to be suspended in said underwater area by said frame for containing aquatic animals of the species whose sounds were recorded in the recording chamber means.

9. The system defined in claim 8 in which motion monitoring means is mounted adjacent the perforated container to observe behavior changes in said animals as the new artificial sound is altered.

10. The system defined in claim 9 in which the motion monitoring means is sonar.

11. The system defined in claim 1 in which means for developing the new artificial sound includes electronically driven sound projectors.

12. The system defined in claim 11 in which the electronically driven sound projectors include an equalizer, a signal generator or a sweep generator.

13. A method for guiding aquatic animals located within a predetermined underwater area including the steps of:
   (a) placing animals of the type possibly present in said underwater area in a recording chamber generally free of external stimuli;
   (b) recording, measuring and analyzing sounds produced by the animals in the chamber;
   (c) placing the animals in a confined area within said predetermined underwater area;
   (d) electrically creating an artificial acoustic radiation with characteristics derived from said recorded sounds of the animals;
   (e) applying the acoustic radiation to said animals contained in the confined area;
   (f) observing behavioral responses of the animals n the confined area to the artificial acoustic radiation applied thereto; and
   (g) adjusting the electrically created artificial acoustic radiation until a desired behavioral response is observed in the animals.

14. The method defined in claim 13 in which the step of generating the acoustic radiation includes producing a primary sound having a plurality of predominate frequencies.

15. The method defined in claim 13 including the step of capturing the animals to be placed in the recording chamber from said underwater area.

16. The method defined in claim 13 including the steps of determining the amplitudes of the recorded sounds produced by the animals and increasing the amplitudes of said recorded sounds when electrically creating the acoustic radiation that is applied to the animals in the confined area.

17. The method defined in claim 13 including the step of projecting a sonar beam into the confined area and monitoring the animals' movement therein as the acoustic radiation is applied to said confined area for observing the behavioral responses of said animals.

18. The method defined in claim 14 including the step of providing the primary sound with predominant frequencies of 120, 240, 360, 480 and 720 Hertz.

19. The method defined in claim 13 including the step of determining the spectrum of the recorded sounds of the animals in the recording chamber.

20. The method defined in claim 19 including the step of intensifying the amplitude range of the predominate frequencies in the spectrum of the recorded sounds when electrically creating the artificial acoustic radiation.

21. The method defined in claim 19 including the step of injecting new frequencies into the spectrum of the recorded sounds when electrically creating the artificial acoustic radiation.

22. The method defined in claim 13 including the step of deriving the electrically created artificial acoustic radiation in relationship to the time duration of the animal sounds and the time duration between sounds.

23. The method defined in claim 13 including the step of measuring the electrically created artificial acoustic radiation produced by installed sound projectors to insure that the acoustic radiation in said underwater area has been properly applied.

24. A method for guiding aquatic animals located within a predetermined underwater area including the steps of:
   (a) recording and analyzing sounds produced by aquatic animals of the type possibly present in said underwater area;
   (b) electrically creating an artificial acoustic radiation with characteristics derived from said recorded sounds of the animals;
   (c) applying said acoustic radiation to the underwater area;
   (d) observing behavioral responses of the aquatic animals in the underwater area to the acoustic radiation applied thereto; and
   (e) adjusting the acoustic radiation to achieve an increased response of the aquatic animals upon observing the behavioral responses of said animals.

25. A method for guiding aquatic animals located within a predetermined underwater area including the steps of:
   (a) placing animals of the type possibly present in said underwater area in a recording chamber generally free of external stimuli;
   (b) recording sounds produced by the animals in the chamber;
   (c) determining the amplitudes of the recorded sounds produced by the animals;
   (d) placing the animals in a confined area within said predetermined underwater area;
   (e) generating acoustic radiation with characteristics derived from said recorded sounds of the animals including increasing the amplitudes of said recorded sounds;
   (f) applying the acoustic radiation to said animals contained in the confined area; and
   (g) observing behavioral responses of the animals in the confined area to the acoustic radiation applied thereto.

26. A method for guiding aquatic animals located within a predetermined underwater area including the steps of:
   (a) placing animals of the type possibly present in underwater area in a recording chamber generally free of external stimuli;
   (b) recording sounds produced by the animals in the chamber;
   (c) placing the animals in a confined area within said predetermined underwater area;
   (d) generating acoustic radiation with characteristics derived from said recorded sounds of the animals;
   (e) applying the acoustic radiation to said animals contained in the confined area;
   (f) projecting a sonar beam into the confined area; and (g) observing behavioral responses of the animals in the confined area to the acoustic radiation applied thereto by monitoring the animal's movement as the acoustic radiation is applied to the confined area.

27. A method for guiding aquatic animals located within a predetermined underwater area including the steps of:
(a) placing animals of the type possibly present in said underwater area in a recording chamber generally free of external stimuli;
(b) recording sounds produced by the animals in the chamber;
(c) determining the spectrum of the recorded sounds of the animals in the recording chamber;
(d) placing the animals in a confined area within said predetermined underwater area;
(e) generating acoustic radiation with characteristics derived from said recorded sounds of the animals;
(f) applying the acoustic radiation to said animals contained in the confined area; and
(g) observing behavioral responses of the animals in the confined area to the acoustic radiation applied thereto.

28. A method for guiding aquatic animals located within a predetermined underwater area including the the steps of:
(a) placing animals of the type possibly present in said underwater area in a recording chamber generally free of external stimuli;
(b) recording sounds produced by the animals in the chamber;
(c) placing the animals in a confined area within said predetermined underwater area;
(d) generating acoustic radiation with characteristics derived from said recorded sounds of the animals including deriving the generated acoustics radiation in relationship to the time duration of the animal sounds and the time duration between sounds;
(e) applying the acoustic radiation to said animals contained in the confined area; and
(f) observing behavioral responses of the animals in the confined area to the acoustic radiation.

* * * * *